United States Patent [19]

Sawaki et al.

[11] Patent Number: 5,091,271

[45] Date of Patent: Feb. 25, 1992

[54] SHAPED SILION CARBIDE-EASED CERAMIC ARTICLE

[75] Inventors: Toru Sawaki; Akio Nakaishi; Keizo Shimada; Takashi Watanabe, all of Iwakuni, Japan

[73] Assignee: Teijin Limited, Osaka, Japan

[21] Appl. No.: 420,560

[22] Filed: Oct. 12, 1989

Related U.S. Application Data

[62] Division of Ser. No. 254,370, Oct. 5, 1988, Pat. No. 4,897,229.

[51] Int. Cl.$^5$ .............................................. C04C 35/56
[52] U.S. Cl. .................................. 428/698; 428/902; 428/367; 501/35; 501/88; 501/95
[58] Field of Search ................ 428/698, 902; 501/35, 501/95, 88

[56] References Cited

U.S. PATENT DOCUMENTS

| | | | |
|---|---|---|---|
| 3,555,138 | 1/1971 | Bryan, Jr. | 264/83 |
| 4,240,835 | 12/1980 | Laskow | 428/408 |
| 4,294,788 | 10/1981 | Laskow et al. | 501/91 |
| 4,310,481 | 1/1982 | Baney | 428/447 |
| 4,404,153 | 9/1983 | Gaul, Jr. | 428/447 |
| 4,482,689 | 11/1984 | Haluska | 428/447 |
| 4,551,436 | 11/1985 | Johnson et al. | 501/88 |
| 4,618,529 | 10/1986 | Yamamura et al. | 428/238 |
| 4,645,807 | 2/1987 | Seyferth et al. | 525/474 |
| 4,650,837 | 3/1987 | Seyferth et al. | 525/478 |
| 4,806,612 | 2/1989 | Chandra et al. | 528/10 |
| 4,820,783 | 4/1989 | Seyferth et al. | 525/474 |
| 4,824,918 | 4/1989 | Bujalski et al. | 525/479 |

FOREIGN PATENT DOCUMENTS 59-40346 3/1984 Japan.
2100711 1/1983 United Kingdom.

*Primary Examiner*—George F. Lesmes
*Assistant Examiner*—Beverly A. Pawlikowski
*Attorney, Agent, or Firm*—Burgess, Ryan and Wayne

[57] ABSTRACT

A shaped silicon carbide-based ceramic article having an improved mechanical strength is produced at a high efficiency by a process comprising the step of: forming an organic silicone polymer, for example, polycarbosilastyrene copolymer, into a predetermined shape, for example, a filament or film; doping the shaped polymer with a doping material consisting of at least one type of halogen, for example, bromine or iodine, in an amount of 0.01% to 150% based on the weight of the shaped polymer, to render the shaped polymer infusible; and pyrolyzing the infusible shaped polymer into a shaped SiC-based ceramic article at a temperature of 800° C. to 1400° C. in an inert gas atmosphere, optionally the halogen-doped shaped polymer being treated with a basic material, for example, ammonia, before the pyrolyzing step, to make the filament uniformly infusible.

2 Claims, No Drawings

ShAPED SILION CARBIDE-EASED CERAMIC ARTICLE

This is a division of application Ser. No. 254,370, filed Oct. 5, 1988, now U.S. Pat. No. 4,897,229.

BACKGROUND OF THE INVENTION (1) Field of the invention

The present invention relates to a process for producing a shaped silicon carbide-based ceramic article. More particularly, the present invention relates to a process for producing a shaped silicon carbide-based ceramic article, for example, a fiber, filament, tape, film, sheet or flake, having superior chemical, physical and thermal properties, from a starting material comprising an organic silicone polymer.

(2) Description of the Related Art

Japanese Unexamined Patent Publication (Kokai) No. 58-215426 discloses a process for producing a shaped silicon carbide-based ceramic article, which process comprises forming a starting material comprising a polysilastyrene as disclosed in U.S. Pat. No. 4,324,901 into a shaped article, for example, a hollow article, film or fiber; applying an ultraviolet ray or electron beam radiation to the shaped article to cross-link and render the article infusible; and then heating (firing) the infusible article.

The above-mentioned process is disadvantageous in that, in the cross-linking step, the shaped article, for example, a fiber exhibits a large shrinkage and an undesirable fusion. Therefore, this process is not suitable for industrial use.

U.S. Pat. No. 4,743,411 discloses a process for producing a shaped silicon carbide article having a high quality at a high efficiency. This process comprises the steps of applying a heat treatment and/or an ultraviolet ray radiation to convert a polysilastyrene to a polycarbosilastyrene copolymer; shaping the copolymer into a shaped article by a melt-shaping method or a dry-shaping method; applying a heat treatment to the shaped copolymer article to make the shaped article infusible; and then heating (pyrolizing) the infusible shaped article in an inert gas atmosphere to convert the infusible copolymer to a silicon carbide-based ceramic.

The above-mentioned process is advantageous in that the shaped silicon carbide-based ceramic article, for example, a fiber or film, has an excellent quality in comparison to that of the conventional article, and can be produced at a high efficiency. Nevertheless, this process is disadvantageous in that, in the heat treatment step, the shaped article is incorporated with a large amount of oxygen, thus the physical properties of the resultant shaped silicon carbide-based ceramic article are not always satisfactory, and the heat treatment for the shaped copolymer article takes a long time.

U.S. Pat. No. 4,100,233 discloses a process, for producing a shaped silicon carbide based ceramic article, in which a polycarbosilane is used as a precursory silicone polymer. This process is also disadvantageous in that, in a step in which the shaped precursory silicone polymer article is cross-linked and made infusible, a large amount of oxygen is incorporated into the shaped silicone polymer article, and thus the physical properties of the resultant shaped silicon carbide-based ceramic article are not always satisfactory and the cross-linking step takes a long time.

SUMMARY OF THE INVENTION

An object of the present invention is to provide a process for producing a shaped silicon carbide-based ceramic article having improved properties, for example, mechanical strength and modulus, from a starting material comprising an organic silicone polymer.

Another object of the present invention is to provide a process for producing a shaped silicon carbide-based ceramic article from a starting material comprising an organic silicone polymer, in which process a procedure for cross-linking the starting material, to render the starting material infusible, is omitted or greatly simplified, and which process can provide an enhanced productivity.

The above-mentioned objects can be attained by the process of the present invention, which comprises the steps of forming an organic silicone polymer into a predetermined shape; doping the shaped organic silicone polymer with a doping material consisting of at least one type of halogen, to an extent such that the doping material is doped in an amount of 0.01% to 150% based on the weight of the shaped organic silicone polymer, to render the shaped organic silicone polymer infusible; and pyrolyzing the infusible shaped organic silicone polymer in an inert gas atmosphere at a temperature of 800° C. to 1400° C., to provide a shaped silicon carbide-based ceramic article.

The infusible shaped organic silicone polymer may be subjected to an preliminary heat treatment at a temperature of 200° C. or higher but lower than 800° C., before the pyrolyzing step at the temperature of 800° C. to 1400° C.

Also, the shaped organic silicone polymer may be subjected to an oxidation treatment in an oxidative atmosphere, before the doping step.

Further, the infusible shaped organic silicone polymer may be subjected to a treatment with a basic material in a non-oxidative atmosphere, before the pyrolyzing step at the temperature of 800° C. to 1400° C. The addition of the treatment with the basic material is effective for producing a shaped silicon carbide-based ceramic article in which an atomic ratio of fixed carbon atoms to silicon atoms is in a range of from 1.5:1 to 2.5:1. This silicon carbide-based ceramic article contains silicon oxide compounds in an amount not exceeding 10.0% by weight in terms of oxygen.

DESCRIPTION OF THE PREFERRED EMBODIMENTS

In the process of the present invention, an organic silicone polymer is formed into a predetermined shape, for example, a fiber, filament, tape, film, sheet or flake.

The organic silicone polymer usable for the present invention is a precursory material for the silicon carbide-based ceramic and, preferably, comprises at least one member selected from polysilastyrenes, polycarbosilanes, polycarbosilastyrene copolymers and co-decomposition polymers of at least two of the above-mentioned polymers. The most preferable silicone polymers are polycarbosilastyrene copolymers.

The polysilastyrene can be produced by a method in which, for example, dichlorodimethylsilane is reacted with dichloromethylphenylsilane in an inert solvent, for example, toluene or xylene, in the presence of a metallic sodium catalyst at a temperature higher than the melting point of the resultant polysilastyrene.

The resultant polysilastyrene comprises, for example, a recurring unit of the formula:

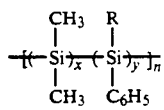

wherein R represents a —CH$_3$ or —C$_6$H$_5$ radical, n represents an integer of 10 to 3,000 and x and y, respectively, represent an integer satisfying the relationship:

$$0.2 \leq \frac{x}{x+y} \leq 0.9$$

preferably $$0.3 \leq \frac{x}{x+y} \leq 0.7$$

The polysilastyrene may be mixed with a small amount of a polysilane.

A method for producing a polysilastyrene is disclosed in detail in U.S. Pat. No. 4,324,901.

The polycarbosilane usable for the present invention can be produced, for example, by a thermal decomposition transformation reaction at a high temperature under pressure. Examples of the method for producing the polycarbosilane are disclosed by German Unexamined Patent Publication (DE-OS) No. 2,236,078, U.S. Pat. No. 4,052,430.

The most preferable polycarbosilastyrene copolymers as a starting material for the process of the present invention were disclosed for the first time by the inventors of the present invention in U.S. Pat. No. 4,743,411 and Japanese Unexamined Patent Publication (Kokai) No. 62-275131. The polycarbosilastyrene copolymers can be produced from polysilastyrenes by applying a heat treatment and/or an ultraviolet ray radiation to the polysilastyrene.

The heat treatment for the polysilastyrenes is carried out at a temperature of from 300° C. to 500° C., preferably, from 350° C. to 450° C. for a time period of from 5 minutes to 10 hours. For example, the heat treatment can be completed by being carried out at a temperature of 500° C. for 3 to 10 minutes or at a temperature of 450° C. for 10 to 100 minutes.

The ultraviolet ray radiation is preferably carried out by radiating ultraviolet rays from an ultraviolet ray lamp having an output of 5 to 500 W/cm at a temperature of 20° C. to 200° C.

During the above-mentioned heat treatment or ultraviolet ray radiation, a benzene is generated as a by-product having a low boiling point from the polysilastyrene, methyl radicals in the polysilastyrene molecules are rearranged to form carbosilane units of the formula:

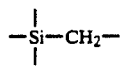

and a portion of the resultant copolymer molecules is cross-linked to increase the molecular weight of the resultant copolymer and to increase the softening point and shaping temperature of the resultant copolymer.

The polycarbosilastyrene copolymers includes organic silicone copolymers having the carbosilane recurring units, silastyrene recurring units and partial cross-linking groups. Preferably, the polycarbosilastyrene copolymer has a molecular weight of 1000 to 50,000 and a copolymerizing molar ratio of the carbosilane units to the silastyrene units in a range of from 3:7 to 7:3.

In the forming step in the process of the present invention, the organic silicone polymer may be mixed with a small amount, for example, 20% based on the weight of the silicone polymer, of an additive comprising at least one member selected from organic lubricants, modifying agents, cross-linking agents, stabilizers, etc.

The organic lubricants preferably comprise at least one member selected from higher fatty acids, higher fatty acid esters, higher fatty acid amides, and higher aliphatic alcohols. The higher fatty acids include capric acid, lauric, palmitic acid, margaric acid, stearic acid, and oleic acid. The higher fatty acid esters includes capric esters, nonyl acetate, lauric esters, ethyl stearate, butyl stearate, and other esters of the above-mentioned fatty acids. The higher fatty acid amides include oleic amide, linolenic amide, linoleic amide, and stearic amide. The higher aliphatic alcohols include capryl alcohol, decyl alcohol, lauryl alcohol, oleyl alcohol, and stearyl alcohol.

The organic lubricants are advantageously used for the production of a silicon carbide-based ceramic tape, sheet or film in accordance with the process of the present invention.

The organic silicone polymer may be mixed with finely pulverized silicon, titanium, silicon carbide, and-/or titanium carbide in a small amount such that this additive does not deteriorate the formability of the organic silicone polymer mixture. The formation of the organic silicone polymer into a predetermined shape, for example, a fiber, filament, tape, film, sheet or flake can be effected by a melt-forming method or a dry (solution) forming method.

In the melt-forming method, an organic silicone polymer is melted, the melt is extruded through an orifice or slit into an ambient cooling atmosphere, and the stream of the melt is solidified by cooling.

In the dry-forming method, an organic silicone polymer is dissolved in a volatile organic solvent, the resultant dope is extruded through an orifice or slit, and the stream of dope is solidified by evaporating the organic solvent. From the viewpoint of industrial use, the melt-forming method is advantageous. This method of melt-forming the organic silicone polymer is disclosed, for example, in U.S. Pat. No. 4,743,411.

In the process of the present invention, the shaped organic silicone polymer is made infusible by doping the shaped organic silicone polymer with a doping material consisting of at least one type of halogen, preferably, at least one member selected from chlorine, bromine and iodine, to an extent such that the doping material is doped in an amount of 0.01% to 150%, preferably 0.1% to 50%, based on the weight of the shaped organic silicone polymer to the shaped organic silicone polymer. The most preferable doping material consists of at least one member selected from bromine and iodine.

It was found by the inventors of the present invention, for the first time, that the doping of the shaped organic silicone polymer with a doping material consisting of at least one type of halogen, for example, chlorine, bromine and iodine renders the shaped organic silicone polymer infusible without applying another cross-linking treatment for making the shaped organic silicone polymer infusible which treatment causes an undesirable deterioration of the shaped organic silicone polymer.

To dope with the treating material, the shaped organic silicone polymer, for example, melt-spun organic silicone polymer filaments are introduced into a gas atmosphere containing the doping material or immersed in a solution of the doping material in a solvent, for example, water, or coated with a coating liquid containing the doping material.

The doping procedure may be carried out in an oxygen-containing atmosphere. This procedure can render the shaped organic silicone polymer infusible, but the presence of oxygen in the doping system sometimes results in an undesirable side reaction of oxygen with the shaped organic silicone polymer. Accordingly, the doping procedure is preferably carried out in an inert gas atmosphere or under vacuum to avoid the undesirable side reaction of the shaped organic silicone polymer with oxygen. The inert gas preferably consists of at least one member selected from nitrogen, argon and helium gases.

The doping procedure is preferably conduct at a temperature of 50° C. or more but at least 10° C. below the softening point of the shaped organic silicone polymer, preferably 100° C. or more but at least 10° C. below the softening point of the polymer. The reasons why the above-mentioned considerably high temperature is preferable for the doping procedure are not fully known, but in view of the fact that, when the doping procedure is carried out at a temperature of 50° C. or more, especially 100° C. or more, the color of the surface of the resultant doping material (halogen) doped, shaped organic silicone polymer is different from the inherent color of the doping material (halogen), it is assumed that certain reactions occur between the doping material and the shaped organic silicone polymer, and thus the shaped organic silicone polymer becomes infusible.

It has been found that, when the doping material (halogen)-doped shaped organic silicone polymer is heated, a cross-linking reaction is initiated at a temperature significantly lower, sometimes 100° C. or more lower, than that of non-doping material (halogen) doped, shaped organic silicone polymer. The cross-linking reaction-initiating temperature of the doped, shaped organic silicone polymer is lower than the softening temperature thereof. Therefore, the doped, shaped organic silicone polymer of the present invention can be directly subjected to the heat-converting step without an additional treatment for cross-linking the shaped organic silicone polymer.

In the process of the present invention, the infusible shaped organic silicone polymer is pyrolyzed in an inert gas atmosphere at a temperature of from 800° C. to 1400° C., preferably from 1000° C. to 1300° C., to convert same to a shaped silicon carbide-based ceramic article. The inert gas preferably consists of at least one member selected from nitrogen, argon and helium gases.

The pyrolyzing procedure at the temperature of 800° C. to 1400° C. is usually carried out for a time of from 1 minutes to 2 hours.

The process of present invention optionally comprises an additional step of preliminarily heating the infusible shaped organic silicone polymer in an inert gas atmosphere at a temperature of 200° C. or higher but lower than 800° C., preferably from 200° C. to 500° C., before the pyrolyzing step at 800° C. to 1400° C. This preliminary heating step is carried out for a time of 1 minute to 3 hours in an inert gas, for example, nitrogen, argon or helium gas.

This additional preliminary heating step is effective for enhancing the infusibility of the shaped organic silicone polymer.

Usually, a specific additional treatment for making the shaped organic silicone polymer infusible in an ambient air atmosphere is unnecessary, but when it becomes necessary, the shaped, doped organic silicone polymer is heated in an ambient air atmosphere at a relatively low temperature, for example, 120° C. or less, before the pyrolyzing step at 800° C. to 1400° C., unless the shaped organic silicone polymer will be deteriorated thereby.

In conventional processes which do not include the step of doping the shaped organic silicone polymer with halogen, the shaped organic silicone polymer must be preliminarily heated in an air atmosphere, to render same infusible before heat conversion to a silicon carbide-based ceramic article. In this preliminary heating procedure, oxygen in the air atmosphere is incorporated into the molecular chains of the silicone polymer and group of the formula —Si—O— are introduced into the molecular chains. Accordingly, the resultant silicon carbide-based ceramic article from the oxygen-containing shaped organic silicone polymer contains oxygen in an amount of several % more than ten %. That is, the resultant silicon carbide-based ceramic contains a considerable amount of undesirable group —Si—O— in addition to silicon carbide group, and thus exhibits a decreased mechanical strength and heat-resistance.

When the process of the present invention is carried out without an additional heating step in air, oxygen is not substantially introduced into the molecular chains of the shaped organic silicone polymer, and the doped halogen reacts with hydrogen in the organic silicone polymer molecules and dissociates from the organic silicone polymer during the heat converting step. Accordingly, the content of the group —Si—O— in the resultant silicon carbide-based ceramic article of the present invention is very small and the ceramic article has an enhanced quality.

The process of the present invention optionally includes an additional step of applying an oxidation treatment to the shaped organic silicone polymer in an oxidative atmosphere, before the doping step with halogen.

In the above-mentioned doping step, the amount and distribution of the doping material doped to the shaped organic silicone polymer are sometimes uneven, depending on the type, degree of polymerization, and other physical properties of the organic silicone polymer, and thus the resultant silicon carbide-based ceramic article sometimes exhibit uneven physical properties, for example, flame-resistance.

The additional oxidation treatment is effectively eliminates the above-mentioned problem of the doping process and makes the effect of the doping step even. Nevertheless, as stated above, the introduction of oxygen into the molecular chains of the organic silicone polymer should be restricted to a very small amount.

In the additional oxidation treatment, the oxidative atmosphere preferably comprises a molecular oxygen-containing gas, for example, air, a nitrogen oxide-containing gas, an ozone-containing gas.

The oxidative atmosphere usable for the additional oxidation treatment satisfactorily contains a small amount of ozone. The preferable content of ozone in the oxidative atmosphere is variable, depending on the treating temperature and time. Usually, the oxidation atmosphere contains 0.01% by volume or more of ozone. When this oxidation atmosphere is used, the oxidation treatment is preferably carried out at a temperature of from 0° C. to 100° C., for one hour or less.

The additional oxidation treatment is preferably carried out to an extent such that the weight of the shaped organic silicone polymer is increased by 0.5% to 10%, more preferably 0.5% to 5%, still more preferably 0.5% to 3%.

If the weight increase is more than 10%, an excessive amount of oxygen is introduced into the shaped organic silicone polymer, and thus the resultant shaped silicon carbide-based ceramic article exhibits unsatisfactory properties. If the weight increase is less than 0.5%, the effect of the additional oxidation treatment is unsatisfactory.

The effect of the additional oxidation treatment will be further illustrated by the following experiments.

A polycarbosilastyrene copolymer having a number average molecular weight of 4600 and a softening point of 240° C. was melted and extruded at a temperature of 282° C. through orifices having a diameter of 0.15 mm, to provide filaments having a diameter of 9 μm.

The polycarbosilastyrene copolymer filaments were oxidation treated at a temperature of 40° C. in an oxidative atmosphere containing 0.1% by volume of ozone to an extent such that the weight increase of the filaments reached 2%. A portion of the oxidation-treated filaments was doped with 5% by weight of iodine at a temperature of 180° C. in an inert gas atmosphere consisting of nitrogen gas, then preliminarily heated at a temperature of 250° C., 300° C., or 350° C. for one hour in a nitrogen gas atmosphere, and finally pyrolized at a temperature of 1200° C. in an inert gas atmosphere consisting of nitrogen gas.

The other portion of the polycarbosilastyrene copolymer filaments was subjected to the same procedures as those mentioned above, except that the iodine doping procedure was omitted.

It was confirmed that all of the filaments which were oxidation treated but not doped with iodine were preliminarily heated at a temperature of 250° C. to 350° C. without fusing and adhering to each other, but all thereof were fuse-broken or fuse-adhered to each other in the pyrolyzing step at a temperature of 1200° C.

It was found that all of the filaments which were oxidation treated and doped with iodine were preliminarily heated at the temperature of 250° C. to 350° C. without fusing and fuse-adhering to each other and all thereof, except for a portion of the filaments preliminarily heated at a temperature of 250° C., could be heat-converted to silicon carbide-based ceramic filaments without fusing and fuse-adhering.

The polycarbosilastyrene copolymer used has a high order cross-linking reaction-initiating temperature of about 320° C., and the reaction rate increases in a temperature range of from 350° C. to 400° C. Accordingly, the polycarbosilastyrene copolymer filaments which were oxidation treated with ozone and cross-linked, but not doped with iodine, are substantially thermally stable at a temperature of about 350° C. or less, but at a temperature higher than about 350° C., the inside portions of the filaments are fluidized and the filaments are fuse-adhered or fuse-broken. To make the ozone-treated filament thermally stable at a higher temperature than about 350° C., an additional cross-linking treatment is necessary in an oxidative atmosphere, but this additional cross-linking treatment in the oxidative atmosphere results in an undesirable deterioration of the quality of the resultant shaped silicon carbide-based ceramic article.

The polycarbosilastyrene copolymer filaments, which were oxidation treated with ozone and doped with iodine, had a high order cross-linking reaction-initiating temperature of about 250° C., and accordingly, the filaments could be stably converted to the silicon carbide-based ceramic filaments, although the amount of oxygen introduced into the filaments was very small, and thus the quality of the resultant silicon carbide-based ceramic filaments was not deteriorated.

Although the organic silicone polymer filaments are produced by using a melt-spinning orifice having a regular circular cross-section, the resultant silicon carbide-based ceramic filaments produced by the above-mentioned process including the additional oxidation treating step exhibit an elliptical or cocoon-shaped cross-sectional profile. A ratio S/A of the circumference (S) of the elliptical or cocoon-shaped cross-sectional profile to a circumference (A) of a circle having the same area as that of the elliptical or cocoon-shaped cross-sectional profile is usually in the range of 1.05 to 1.3.

The reasons for the change in the cross-sectional profile of the filaments are not fully known, but it is assumed that a very thin cross-linked protecting layer is formed in the surface portion of the filament, and in the pyrolyzing step in which the inside portion of the filament is softened and heat-decomposed, a gas is generated in the inside portion of the filament and dissociated therefrom, and thus the inside portion is shrunk.

The process of the present invention optionally includes an additional step of treating the infusible shaped organic silicone polymer with a basic material in a non-oxidative medium, before the pyrolyzing step at a temperature of 800° C. to 1400° C.

The basic material usable for the present invention comprises at least one member selected from, for example, ammonia, sodium hydroxide, potassium hydroxide, methylamine, and ethylenediamine. A most preferable basic material consists of ammonia.

The treatment for the infusible organic silicone polymer with the basic material is preferably carried out in a non-oxidative medium. This treatment medium is variable depending on the state of the basic material, i.e., if the basic material is supplied as a gas or as a liquid. For example, where the basic material is supplied as a gas, the treatment medium is an inert gas consisting of at least one member selected from, for example, nitrogen, hydrogen, argon and helium.

Where the basic material is supplied as a liquid, the treatment medium consists of an inert solvent, for example, water. This treatment with the solution of the basic material is preferably carried out in a non-oxidative atmosphere.

After the treatment with the basic material is completed, any excess basic material on the surface of the infusible shaped organic silicone polymer is preferably removed by immersing in water or by heating. If necessary, the infusible shaped organic silicone polymer is then dried, and this drying operation is preferably carried out in a non-oxidative gas atmosphere or at a low temperature, to prevent an undesirable introduction of oxygen into the molecular chains of the organic silicone polymer.

The amount of the basic material to be applied to the infusible shaped organic silicone polymer is variable, and depends on the type and amount of the doping material in the infusible organic silicone polymer. Usually, the basic material is used in an amount in excess of the amount of the doping material doped in the shaped infusible organic silicone polymer. For example, the basic material is preferably used in an amount of 1 to 400 times the equivalent amount of the doping material doped in the shaped organic silicone polymer.

In the additional treating step with the basic material, there is no limitation to the treating temperature used, because the association or reaction of the doping material in the infusible organic silicone polymer with the basic material is very easily initiated. Generally, in view of the operating efficiency, the additional treatment with the basic material is preferably carried out at a temperature of from 0° C. to 500° C., more preferably from room temperature to 350° C.

The basic material-treated infusible organic silicone polymer exhibits an increased melting point and does not melt at a higher temperature of, for example, from 350° C. to 400° C. Accordingly, the basic material-treated infusible shaped organic silicone polymer can be heat-converted to a shaped silicon carbide-based ceramic article without deformation, fuse-adhesion or fuse-breakage.

The inventors of the present invention confirmed that, even when the additional treatment with the basic material is carried out at room temperature, the resultant infusible shaped organic silicone polymer is not soluble in toluene, which is a good solvent for the original organic silicone polymer. This indicates that certain cross-linkages are formed in the basic material-treated infusible shaped organic silicone polymer.

The process of the present invention including the additional treating step with the basic material is very effective for uniformly creating the infusibility of the infusible shaped organic silicone polymer. Accordingly, where an organic silicone polymer filament is subjected to the process of the present invention including the additional basic material-treating step, the resultant silicon carbide-based ceramic filament has a cross-sectional profile similar to that of the original organic silicone polymer filament, because the pyrolyzation can be carried out evenly throughout the filament, without partial fusion or softening of the filament.

Therefore, a ratio S/A of a circumference (S) of the cross-section of the silicon carbide-based ceramic filament to the circumference (A) of a circle having the same area as that of the cross-section is usually in the range of from 1 to 1.1.

The resultant shaped silicon carbide-based ceramic article from the process of the present invention including the additional basic material-treating step has an atomic ratio of fixed carbon atoms to silicon atoms of 1.5:1 to 2.5:1.

The content of the fixed carbon in the shaped silicon carbide-based ceramic article is determined as a difference between an entire carbon content and a free carbon content thereof.

The free carbon is carbon combustible at a temperature of about 800° C. in oxygen atmosphere.

The contents of the entire carbon, the free carbon, and the silicon are determined by usual analytical methods.

The value of the atomic ratio, from 1.5:1 to 2.5:1 is significantly larger than that of the conventional shaped silicon carbide-based ceramic article. This means that the shaped silicon carbide-based ceramic article produced by the above-mentioned specific process of the present invention contains a very small amount of the free carbon, and thus is very thermally, chemically, and physically stable.

The shaped silicon carbide-based ceramic article produced by the above-mentioned specific process of the present invention contains silicon oxide compounds in a very small amount of 10% by weight or less, preferably 7.0% by weight or less, more preferably 5% by weight or less, for example, 0.5% to 5% by weight, in terms of oxygen, because the doping and basic material-treating steps of the present invention for making the shaped organic silicone polymer infusible do not introduce oxygen into the polymer. The above-mentioned content of the oxygen usually falls within the range of the sum of the quotient of the content (%) by weight of oxygen in the polymer by a heat-conversion yield, and is 5% by weight.

When the process of the present invention including the additional basic material-treating step is applied, the resultant silicon carbide-based ceramic filament can exhibit a tensile strength of 300 kg/mm$^2$ or more, preferably 330 kg/mm$^2$ or more, more preferably 350 kg/mm$^2$ or more.

In the process of the present invention, the specific doping step for the shaped organic silicone polymer with a doping material comprising at least one type of halogen, preferably bromine and iodine, is very effective for rendering the shaped organic silicone polymer infusible without an introduction of oxygen into the polymer.

When the additional preliminary heating step is applied, this additional step can be completed at a relatively low temperature out in a relatively short time.

The resultant shaped silicon carbide-based ceramic article exhibits uniform and superior physical properties, for example, mechanical strength and modulus than those of a conventional shaped silicon carbide-based ceramic article. For example, a silicon carbide-based ceramic filament produced by the process of the present invention has a tensile strength and modulus higher by about 10% or more than those of conventional filament.

Accordingly, the process of the present invention is useful for producing various shaped silicon carbide-based ceramic article, for example, filaments fibers, tapes, films and sheets, having an improved quality.

The present invention will be further explained by way of specific examples, which examples are representative and do not restrict the scope of the present invention in any way.

In the Examples, the amounts of silicon, oxygen and carbon were determined by the following methods.

Quantitative determination of silicon

A predetermined amount (about 50 mg) of a sample was place in a platinum crucible and evenly mixed with about 0.5 g of sodium carbonate and about 5 ml of water, and the mixture was heated and dry-solidified. The dry mixture was melted in an electric furnace at a temperature of about 850° C. for 3 minutes, and then cooled. The resultant product was dissolved in water, and the solution was placed in a 100 ml egg plant type flash so that an upper surface level of the solution precisely reached an indication line of the flask. A portion of the solution in a precise amount of 10 ml was diluted with water to 50 ml and the diluted solution was subjected to an ICP spectroscopic analysis to quantitatively determine the amount of silicon in the sample Quantitative determination of oxygen.

A sample in a predetermined amount (around 20 mg) was placed in a tin capsule and the capsule was placed in a graphite crucible. A predetermined amount of a flux material (for example, zinc or nickel) was mixed in the capsule. The graphite crucible was heated by applying a large electric current in an inert gas (helium) to instantly melt the sample.

A resultant gas containing carbon monoxide (CO) gas from the reaction of oxygen contained in the sample with graphite (carbon) was brought into contact with a copper oxide catalyst stratum to convert the CO the carbon dioxide ($CO_2$). The resultant gas was subjected to an infra-red analysis to determine the amount of oxygen in the sample.

Quantitative determination of carbon

A filament sample in a predetermined amount (about 20 mg to 100 mg) and in a predetermined length of 15 mm was mixed with a combustion assistant (copper, tin, iron or tungsten. The sample was then completely oxidized by radio frequency induction heating in an oxygen flow. A combustion gas resulting from the oxidation of carbon in the sample and containing carbon dioxide and carbon monoxide was brought into contact with a copper oxide or platinum catalyst stratum to convert the carbon monoxide to carbon dioxide. The resultant gas was subjected to an infra-red or heat transmission analysis to determine the amount of carbon in the sample.

In the Examples, the physical properties of the filaments were determined by the same method as given in J I S R 760-1986 for carbon fibers, with the following exception.

The cross-sectional area of the filaments was determined in accordance with the laser method of J I S R 7601 (3.1) when the filaments had a circular (regular) cross-sectional profile, and the thickness and density of the filament were determined by the method of J I S R 7601 (3.3) when the filaments had an irregular cross-sectional profile.

The density of the filaments was determined by a sink-float method in which a mixture of bromoform and tetrachloromethane was used as the medium.

EXAMPLE 1 and COMPARATIVE EXAMPLE 1

In each of Example 1 and comparative Example 1, equivalent molar amounts of dichlorodimethylsilane and dichloromethylphenylsilane were polymerized in the presence of a sodium-dispersed catalyst in a medium consisting of toluene at a temperature of 110° C.

The resultant polysilastyrene having a softening point of from 86° C. to 94° C. was heat-treated at a temperature of 400° C. for 20 minutes in an inert (nitrogen) gas atmosphere, and further heat treated at the same temperature as that mentioned above under a reduced pressure for 5 minutes. The resultant polycarbosilastyrene copolymer had a softening point of 190° C. to 200° C., a number average molecular weight of 4500, and a molar ratio of the recurring carbosilane units to recurring carbosilastyrene units of 45/55.

The polycarbosilastyrene copolymer was melt spun, at a temperature of 235° C. and at a take up speed of 600 m/min, into filaments each having a diameter of 11 μm.

In Example 1, the polycarbosilastyrene copolymer filaments as described above were placed, together with iodine in an amount of 1% based on the weight of the filaments, in a pressure vessel. The inside pressure of the pressure vessel was reduced to a 0.5 Torr. This pressure-reducing operation was halted by introducing a high purity nitrogen gas into the vessel. The above-mentioned operations were repeated several times to completely remove oxygen from the inside of the vessel, and then the inside of the vessel was filled with nitrogen gas. The polycarbosilastyrene copolymer filaments were doped with iodine at a temperature of 180° C. for one hour, and thereafter, the doped filaments were preliminarily heated in the nitrogen gas atmosphere at a temperature of 350° C. for one hour. The preliminarily heated infusible filaments were removed from the vessel and then pyrolyzed under a load of 10 g/10000 d at a temperature of 700° C. for 2 minutes, and then at a temperature of 1200° C.

The resultant SiC-based ceramic filaments exhibited a tensile strength of 379 $kg/mm^2$ and a modulus of elasticity of 18.7 $g/mm^2$.

The ceramic filaments were heated at a temperature of 1200° C. for one hour in a nitrogen gas atmosphere, and ratio (tensile strength-retaining ratio) in tensile strength of the heated ceramic filaments to the original ceramic filaments was very high, i.e., in the range of from 90 to 95%.

In Comparative Example 1, the same procedures as those described in Example 1 were carried out except that the iodine-doping procedures were replaced by a heating procedure at a temperature of 180° C. for 3 hours in air. The resultant ceramic filaments exhibited a tensile strength of 220 $kg/mm^2$, and a poor tensile strength-retaining ratio of from 50% to 60%.

EXAMPLE 2

A polydimethylsilane polymer was treated in an autoclave at a temperature of 470° C. for 14 hours, and then a by-product having a low boiling point was removed by distillation under a reduced pressure. The resultant polycarbosilane polymer was melt-spun, at a temperature of 330° C. and a take up speed of 400 m/min, into filaments having a diameter of 13.8 μm.

The polycarbosilane filaments were doped with 1% by weight of iodine in the same manner as mentioned in Example 1, and the iodine doped filaments were pyrolyzed into SiC-based ceramic filaments at a temperature of 1200° C.

The resultant SiC-based ceramic filaments had a diameter of 9 μm and a tensile strength of 340 $kg/mm^2$.

EXAMPLE 3 and COMPARATIVE EXAMPLE 2

In Example 3, the same procedures for producing the polycarbosilastyrene copolymer as described in Example 1 were carried out except that the heat treatment for the polysilastyrene at 400° C. in the nitrogen gas atmosphere was carried out for 30 minutes. The resultant polycarbosilastyrene copolymer had a number average molecular weight of 4600 and exhibited a softening point of from 230° C. to 240° C.

The polycarbosilastyrene copolymer was melt-spun, at a temperature of 280° C. at a take up speed of 600 m/min, into filaments having a diameter of 11 μm.

The polycarbosilastyrene copolymer filaments were placed in a closed glass container, and air containing 0.1% by volume of ozone was made to flow through the closed glass container, at a temperature of 40° C. and at a flow rate of 130 ml/min for 5 minutes, to apply an oxidation treatment to the filaments. Due to the oxidation treatment, the weight of the filaments was increased by 2.3% based on the original weight of the filaments.

The oxidation treated filaments were subjected to the same iodine doping procedures as mentioned in Example 1, except that the amount of iodine was 5% based on the weight of the original filaments and the reduced pressure of the pressure vessel was 0.2 Torr.

The iodine-doped filaments were preliminarily heated in the pressure vessel in the nitrogen gas atmosphere at a temperature of 350° C. for 15 minutes. The preliminarily heated filaments were taken up from the pressure vessel and then pyrolyzed into SiC-based ceramic filaments at a temperature of 1200° C. and under a load of 10 g/1000 d.

The resultant ceramic filaments had a thickness corresponding to a circular cross section having a diameter of 7.5 μm and exhibited a tensile strength of 360 kg/mm$^2$ and a high tensile strength-retaining rate of 85 to 90% under the same conditions as mentioned in Example 1.

In Comparative Example 2, the same procedures as mentioned in Example 3 were carried out except that the iodine-doping procedures were replaced by a heating procedure at a temperature of 180° C. for 3 hour in air. The resultant comparative ceramic filaments had a tensile strength of 240 kg/mm$^2$ and a poor tensile strength-retaining ratio of 50% to 60%.

EXAMPLES 4 and 5

In Example 4, a polycarbosilastyrene copolymer having a softening point of 180° C. to 190° C. was prepared by a method similar to that mentioned in Example 1, and melt-spun, at a temperature of 230° C. at a take up speed of 600 m/min, into filaments having a diameter of 11 μm.

In Example 4, a half portion of the polycarbosilastyrene copolymer filaments was oxidation treated with ozone at a temperature of 40° C., in the same manner as mentioned in Example 3, so that the weight of the filaments was increased by 2 to 3%, and the oxidation-treated filaments were doped with 5% by weight of iodine at a temperature of 180° C. for one hour in a nitrogen gas atmosphere, in the same manner as described in Example 3.

In Example 5, the other half portion of the polycarbosilastyrene copolymer filaments was directly doped with 5% by weight of iodine in the same manner as mentioned above, but the oxidation treatment was not applied.

A filament bundle consisting of 20 filaments in each of the above-mentioned portions, was preliminarily heated at a temperature of 350° C. for one hour in a nitrogen gas atmosphere, and then pyrolyzed at a temperature of 1200° C. in a nitrogen gas atmosphere.

The resultant SiC-based ceramic filaments in Example 4 had an average tensile strength of 365 kg/mm$^2$ and a standard deviation in the tensile strength, of 25 kg/mm$^2$.

The resultant SiC-based ceramic filaments of Example 5 had a tensile strength of 330 kg/mm$^2$ and a standard deviation of the tensile strength of 35 kg/mm$^2$.

The resultant SiC-based ceramic filaments of Examples 4 and 5 had a tensile strength-retaining ratio of 90%.

EXAMPLE 6

The same procedures for producing a polycarbosilastyrene copolymer filaments as described in Example 3 were carried out.

The resultant polycarbosilastyrene copolymer filaments had a diameter of 7.8 μm and were directly subjected to the same iodine-doping procedures as mentioned in Example 3, and doped with 5% by weight of iodine in the pressure vessel.

The inside of the pressure vessel containing the iodine-doped filaments was completely filled with nitrogen gas, and then the nitrogen gas was replaced by ammonia gas. The iodine-doped filaments were treated with the ammonia gas at room temperature for one hour.

The ammonia-treated filaments were removed from the pressure vessel and pyrolyzed into SiC-based ceramic filaments, at a temperature of 1200° C. and under a load of 10 g/10,000 d in a nitrogen gas atmosphere.

The resultant ceramic filaments had a diameter of 5.2 μm and a tensile strength of 430 kg/mm$^2$. When the filaments were exposed to air at a temperature of 1200° C. for one hour, the tensile strength of the heated ceramic filaments was the same as that of the original ceramic filaments.

As a result of an elemental analysis applied to the SiC-based ceramic filaments, it was confirmed that the atomic ratio of fixed carbon atoms to silicon atoms was 2.15:1 and the content of silicon oxide compounds was 5% by weight in terms of oxygen.

EXAMPLE 7

The same procedures as described in Example 6 were carried out, with the following exceptions.

The amount of iodine doped in the polycarbosilastyrene copolymer filaments was 20% based on the weight of the original filaments.

The resultant SiC-based ceramic filaments had a diameter of 5.2 μm and a tensile strength of 376 kg/mm$^2$.

The ceramic filaments exhibited a tensile strength-retaining ratio of 100% after exposure at a temperature of 1200° C. for one hour in air.

As a result of an elemental analysis, it was confirmed that the ceramic filaments had an atomic ratio of fixed carbon atoms to silicon atoms of 2.2:1, and a content of silicon oxide compound of 4.2% by weight in terms of oxygen.

EXAMPLE 8

The same procedures as described in Example 6 were carried out except that the amount of iodine doped in the polycarbosilastyrene copolymer filaments was 10% based on the weight of the filaments; the preliminary heating procedure in the nitrogen gas atmosphere in the pressure vessel was carried out by elevating the temperature of the filament from room temperature to 350° C. over a period of 90 minutes, and then maintaining the temperature at the level of 350° C. for one hour; and the load applied to the ammonia-treated filaments in the pyrolyzing step was 100 g/10000 d.

The resultant SiC-based ceramic filaments had a tensile strength of 384 kg/mm$^2$ and a tensile strength-retaining ratio of 100%, after exposure to air at 1200° C. for one hour.

As a result of our elemental analysis, the ceramic filaments were found to have an atomic ratio of fixed carbon atoms to silicon atoms of 2.06:1 and a content of silicon oxide compounds of 5.8% by weight in terms of oxygen.

COMPARATIVE EXAMPLE 3

The same procedures as described in Example 6 were carried out with the following exceptions.

The iodine-doping procedures for the polycarbosilastyrene copolymer filaments having a diameter of 7.8 μm were replaced by heat-treating procedures at a temperature of 120° C. for 3 hours in air, and then at a temperature of 180° C. for 3 hours in air.

The heat treated polycarbosilastyrene copolymer filaments were preliminarily heated at a temperature of 350° C. under a load of 100 g/10,000 d for 2 hours, while flowing a nitrogen gas through the pressure vessel.

The resultant SiC-based ceramic filaments had a diameter of 8.8 μm and a poor tensile strength of 200 kg/mm$^2$. After exposure to air at 1200° C. for one hour, the tensile strength-retaining ratio of the ceramic filaments was 40%.

As a result of an elemental analysis, the ceramic filaments were found to have a poor atomic ratio of fixed carbon atoms to silicon atoms of 1.1:1 and a large content of silicon oxide compounds of 18% by weight in terms of oxygen.

EXAMPLE 9

A polycarbosilane polymer was prepared by heating a linear polydimethylsilane produced from dimethyldichlorosilane, at a temperature of 400° C. for 48 hours in an inert gas (argon gas) atmosphere in an autoclave, in accordance with a process disclosed in Japanese Examined Patent Publication (Kokoku) No. 57-53894.

The polycarbosilane was melt-spun, at a temperature of 270° C. at a take up speed of 600 m/min, into filaments having a diameter of 9.2 μm.

The polycarbosilane filaments were subjected to the same iodine-doping and ammonia-treating procedures as described in Example 8.

The ammonia-treated filaments were pyrolyzed into SiC-based ceramic filaments by heating at 1200° C. for 2 minutes under a load of 10 g/10,000 d.

The resultant SiC-based ceramic filaments had a diameter of 6.5 μm and a tensile strength of 410 kg/mm$^2$.

As a result of an elemental analysis, the ceramic filaments were found to have an atomic ratio of fixed carbon atoms to silicon atoms of 1.8:1 and a content of silicon oxide components of 3.7% by weight in terms of oxygen.

EXAMPLE 10

The same procedures as those described in Example 6 were carried out with the following exceptions.

The polycarbosilastyrene copolymer filaments had a diameter of 11.4 μm.

The closed glass container containing therein the polycarbosilastyrene copolymer filaments was filled with a high pure nitrogen gas and then the pressure in the container was reduced to 0.2 Torr.

Thereafter the container was filled with a mixed gas consisting of the high pure nitrogen gas and a bromine gas in an amount of 10% based on the weight of the polycarbosilastyrene copolymer filaments. The filaments were doped with bromine at a temperature of 180° C. for one hour in the container.

The mixed gas in the container was replaced by an ammonia gas and the bromine-doped filaments in the container were treated with ammonia at room temperature for one hour.

The ammonia gas in the container was replaced by a nitrogen gas. The filaments were preliminarily heated in the nitrogen gas atmosphere in the container by elevating the temperature of the atmosphere from room temperature to 350° C. over a time of 90 minutes and then maintaining the temperature at the above-mentioned level for one hour.

Then the filaments were pyrolyzed at a temperature of 1200° C. under a load of 10 g/10000 d in a nitrogen gas atmosphere.

The resultant SiC-based ceramic filaments had a diameter of 7.9 μm and exhibited a tensile strength of 350 kg/mm$^2$. Also, the filaments had an atomic ratio of fixed carbon to silicon of 1:2.08 and a content of silicon oxide components of 7.0% by weight is terms of oxygen.

I claim:

1. A shaped silicon carbide-based ceramic article consisting essentially of carbon, silicon and oxygen, having an atomic ratio of fixed carbon atoms to silicon atoms of 1.5:1 to 2.5:1 and containing silicon oxide compounds in an amount of from 0.5% to 7% by weight in terms of oxygen.

2. A shaped silicon carbide-based ceramic article as claimed in claim 1, which is a fiber or filament having a strength of from 300 kg/mm$^2$ to about 430 kg/mm$^2$, and a tensile strength-retaining ratio of from 85% to 100%, when heat-treated at 1200° C. in air.

* * * * *